US 6,644,596 B1

(12) United States Patent
Jurlina et al.

(10) Patent No.: US 6,644,596 B1
(45) Date of Patent: Nov. 11, 2003

(54) DEPLOYMENT SYSTEM FOR INFLATABLE STRUCTURES

(75) Inventors: Thomas A. Jurlina, Wall Township, NJ (US); Edward H. Smialowicz, Point Pleasant, NJ (US); Louis Cassano, Point Pleasant, NJ (US); Charles Smith, Jackson, NJ (US)

(73) Assignee: Air Cruisers Company, Wall, NJ (US)

( * ) Notice: Subject to any disclaimer, the term of this patent is extended or adjusted under 35 U.S.C. 154(b) by 82 days.

(21) Appl. No.: 10/023,749

(22) Filed: Dec. 21, 2001

(51) Int. Cl.[7] .............................. B64C 1/22; B64D 1/08
(52) U.S. Cl. ................. 244/137.2; 244/137.1; 244/905
(58) Field of Search ................ 244/137.1, 137.2, 244/121, 129.2, 905; 193/25 B; 182/48

(56) References Cited

U.S. PATENT DOCUMENTS

| 3,203,352 | A | * | 8/1965 | Schafranek | |
| 3,463,287 | A | * | 8/1969 | Smith | 193/25 B |
| 3,621,383 | A | * | 11/1971 | Rush et al. | 193/25 B |
| 3,815,849 | A | * | 6/1974 | Meston | 244/137.2 |
| 3,840,057 | A | * | 10/1974 | Lesh, Jr. | 244/137.2 |
| 3,910,532 | A | * | 10/1975 | Fischer | 244/137.2 |
| 4,104,964 | A | | 8/1978 | Larkworthy et al. | |
| 4,375,877 | A | * | 3/1983 | Shorey | 244/137.2 |
| 4,457,730 | A | | 7/1984 | Foster et al. | |
| 4,460,343 | A | | 7/1984 | Heimovics, Jr. et al. | |
| 4,512,539 | A | * | 4/1985 | Ackermann et al. | 244/137.2 |
| 4,566,862 | A | | 1/1986 | Halavais | |
| 4,567,977 | A | * | 2/1986 | Fisher | 193/25 B |
| 4,577,817 | A | | 3/1986 | Hernandez | |
| 4,666,413 | A | | 5/1987 | Klein et al. | |
| 5,150,767 | A | * | 9/1992 | Miller | 182/48 |
| 5,161,754 | A | * | 11/1992 | Duggal | 244/137.2 |
| 5,284,453 | A | | 2/1994 | Kun | |
| 5,586,615 | A | * | 12/1996 | Hammer et al. | 182/48 |
| 5,806,572 | A | | 9/1998 | Voller | |
| 5,871,180 | A | | 2/1999 | Hublikar | |
| 5,875,868 | A | | 3/1999 | Smialowicz et al. | |
| 5,975,467 | A | | 11/1999 | O'Donnell et al. | |
| 5,988,438 | A | | 11/1999 | Lewis et al. | |
| 6,298,970 | B1 | | 10/2001 | Targiroff et al. | |

FOREIGN PATENT DOCUMENTS

| EP | 0039465 | * | 11/1981 | 244/137.2 |
| EP | 0039466 | * | 11/1981 | 244/137.2 |

* cited by examiner

Primary Examiner—Michael J. Carone
Assistant Examiner—L. Semunegus
(74) Attorney, Agent, or Firm—Lawrence G. Fridman

(57) ABSTRACT

A system for deployment of a vacuum-packed inflatable structure includes a primary cylinder with a primary valve that can be opened under a primary applied force for discharging a primary pressurized fluid into the inflatable structure. A first connecting arrangement extends between the primary valve and an inflatable actuator bag. A secondary cylinder has a secondary valve movable under a secondary applied force for discharging a secondary pressurized fluid into the inflatable actuator bag. With this arrangement, application of the secondary force to the secondary valve causes the secondary cylinder to inflate the inflatable actuator bag. This in turn causes the first connecting arrangement to open the primary value with the primary applied force and inflate the inflatable structure.

19 Claims, 6 Drawing Sheets

DEPLOYMENT SYSTEM FOR INFLATABLE STRUCTURES

BACKGROUND OF THE INVENTION

1. Field of the Invention

This invention relates generally to the deployment of inflatable structures, and more particularly to a system and method for deployment of vacuum-packed evacuation slides or life rafts associated with aircraft.

2. Description of the Related Art

Inflatable evacuation slides and/or slide rafts provide a rapid means for evacuating passengers and flight personnel in the event of an emergency. In commercial aircraft, the slides are normally stored uninflated in a container mounted on the interior of the aircraft door or immediately adjacent thereto. With the door closed, a girt bar is connected to brackets on the floor inside the doorway such that it is only necessary to open the door to automatically deploy the slide in the event of an emergency evacuation. When the door is opened, the girt bar normally pulls the slide through the doorway until gravity can take effect to unfold or unroll the slide outside of the doorway. Once outside the doorway, the slide or slide/raft is rapidly inflated through the application of fluid pressure.

In military applications, inflatable life rafts and their inflation systems are sometimes located in wing compartments of the aircraft. This is in order to maximize space in the fuselage for transporting equipment, supplies and personnel. A pair of life rafts and their inflation systems may be located in each wing, and are sometimes stored in a vacuum-sealed package. The vacuum-sealed package reduces the size of the folded life raft and also protects the life raft from water, moisture, fungus growth, jet fuels, exhaust soot and debris. The inflation system for each life raft includes a container of highly pressurized gas with an inflation valve that is actuable from a remote location, such as the cockpit by a cable and pulley system routed through the aircraft. When a pull handle or similar device associated with the cable is activated, the valve is opened and the pressurized gas is discharged from the container and into the life raft causing its rapid inflation. However, during the aircraft maintenance procedures, the cables often having considerable length and pulleys may be painted over and not tested and lubricated for movement on a regular basis. Corrosion and debris can also restrict or resist cable movement. Thus, higher pull forces are required to activate the inflation systems.

The use of vacuum-packed inflatable structures exacerbates this problem since a relatively large amount of force is required to break the vacuum and open the inflation valve, which is typically subject to the vacuum force. Instead of the typical 20 to 30 pounds of pull force required to open the inflation valve, it has been found that prior art solutions require anywhere from 100 to 150 pounds of the pull force due at least in part to the vacuum pressure that must be overcome. This amount of pull force may not only be difficult to generate, but may also affect or damage neighboring mechanisms. In emergency situations, where the inflation system must be actuated, the pilot or other personnel may be injured, lack sufficient strength, or be improperly positioned to apply the necessary pull force.

It would therefore be desirable to provide a system for deploying a life raft or other inflatable structure that substantially reduces the pull force required by an operator or an automatic actuating means to trigger the inflation system.

SUMMARY OF THE INVENTION

One aspect of the present invention provides an inflation system for deploying an inflatable structure which includes a primary container fluidly connectable to the inflatable structure. The primary container includes a primary pressurized fluid situated therein and a primary valve movable under a primary applied force from a closed position, while maintaining the primary pressurized fluid in the primary container to an open position while expelling the primary pressurized fluid into the inflatable structure for its inflation. The inflation system further includes an inflatable actuator bag and a secondary container fluidly connectable to the inflatable actuator bag. The secondary container has a secondary pressurized fluid located therein and a secondary valve movable under a secondary applied force from a closed position while maintaining the secondary pressurized fluid in the secondary container to an open position while expelling the secondary pressurized fluid into the inflatable actuator bag. With this arrangement, application of the secondary force to the secondary valve causes the secondary fluid to inflate the inflatable actuator bag and open the first valve with at least the primary applied force, to thereby inflate the inflatable structure. Preferably, the secondary force is greater than the primary force.

Another aspect of the invention provides an inflatable structure in combination with an inflation system for deploying the inflatable structure which includes an envelope containing the inflatable structure under vacuum pressure. A primary container is fluidly connectable to the inflatable structure. The primary container has a primary pressurized fluid located therein and a primary valve movable under a primary applied force from a closed position while maintaining the primary pressurized fluid in the primary container to an open position while expelling the primary pressurized fluid into the inflatable structure to thereby inflate the inflatable structure. The primary valve is also subject to the vacuum pressure in the envelope. An inflatable actuator bag is connected to the envelope and is also subject to the vacuum pressure in the envelope. A first connecting arrangement extends between the envelope and the inflatable actuator bag. A distal end of the first connecting arrangement is connected to the primary valve for moving the primary valve to the open position and a proximal end of the first connecting arrangement is connected to a wall of the inflatable actuator bag. A secondary container is fluidly connectable to the inflatable actuator bag. The secondary container has a second pressurized fluid located therein and a secondary valve movable under a secondary applied force from a closed position while maintaining the secondary pressurized fluid in the secondary container to an open position while expelling the secondary pressurized fluid into the inflatable actuator bag. With this arrangement, application of the secondary force to the secondary valve causes the secondary fluid to inflate the inflatable actuator bag, thereby overcoming the vacuum force and causing the first connecting arrangement to open the primary valve with at least the primary force and inflate the inflatable structure. Preferably, the secondary force is greater than the primary force.

The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements, and wherein.

It is noted that the drawings are intended to depict only typical embodiments of the invention, and therefore should not be considered as limiting the scope thereof. The invention will now be described in greater detail with reference to the accompanying drawings.

DETAILED DESCRIPTION OF THE PREFERRED EMBODIMENTS

Figure 1:
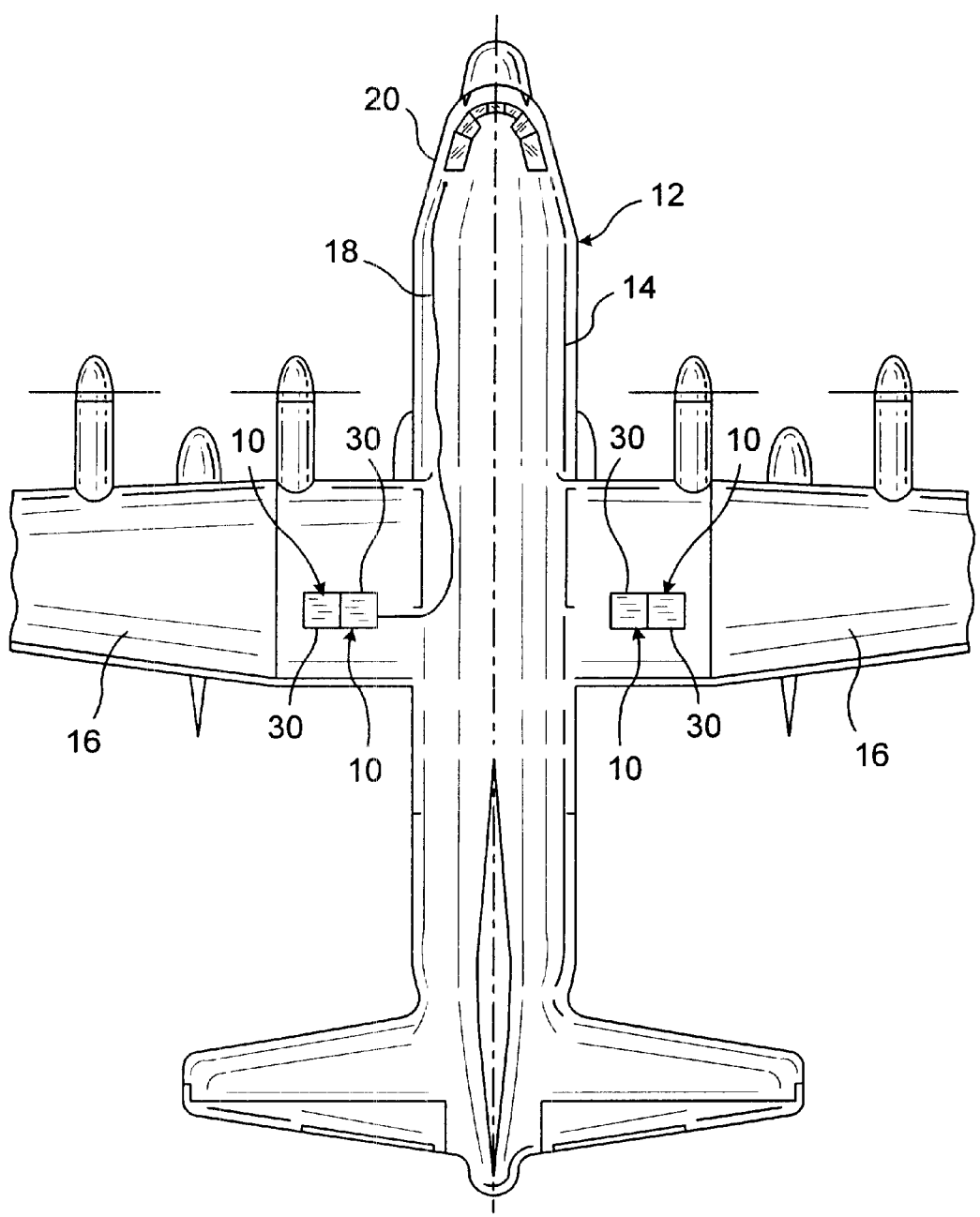
FIG. 1 is a top plan view of a system for deploying a vacuum-packed inflatable life raft according to an exemplary embodiment of the invention installed in an aircraft.

Referring now to the drawings, and to FIG. 1, in particular, an inflation system 10 according to the present invention for deploying an inflatable life raft is illustrated. Preferably, the inflation system 10 is installed in an aircraft 12 having a fuselage 14 and wings 16. As shown, two inflation systems 10 are provided in each wing 16. However, it will be understood that more or less inflation systems 10 can be provided in each wing and/or other parts of the aircraft 12. A cable 18 preferably extends between the inflation systems 10 and the cockpit area 20 of the aircraft 10 for actuating the inflation systems from the cockpit area.

Figure 2:
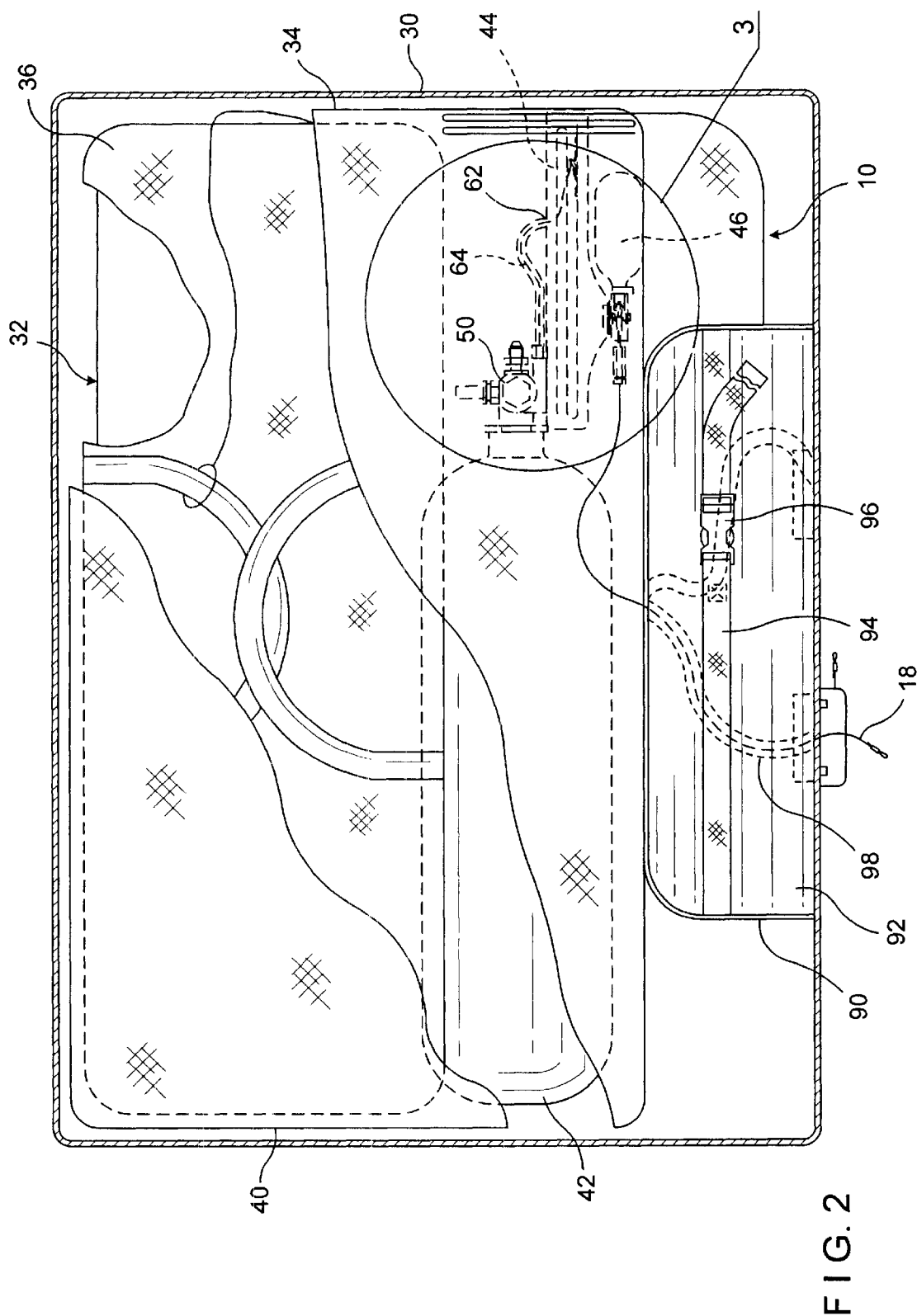
FIG. 2 is a top plan view of the inflation system of FIG. 1 packaged inside an envelope containing the inflatable life raft to be deployed, with a portion of the envelope removed to reveal the contents inside.
Figure 3:
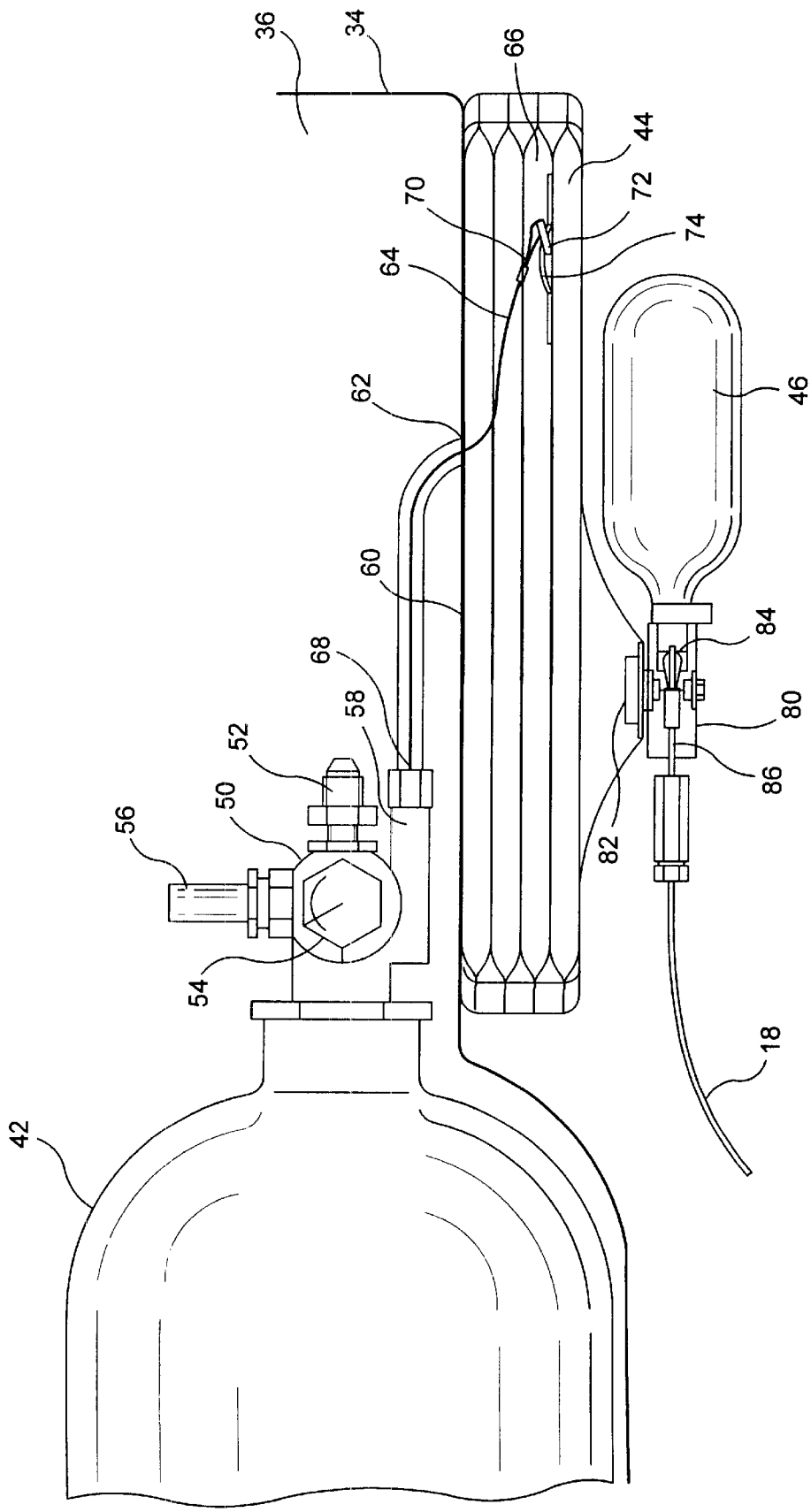
FIG. 3 is an enlarged view of the inflation system in an uninflated condition during storage as shown in the boundary area designated by numeral 3 in FIG. 2.

With reference now to FIGS. 2 and 3, each inflation system 10 is positioned together with an inflatable life raft 32 in a housing or enclosure 40 which is in turn located within a compartment 30 of tie aircraft wing 16 (FIG. 1). The life raft 32 is of conventional construction and is preferably packaged in an envelope 34 and vacuumsealed in a well known manner to reduce the size of the package. The envelope 34 is preferably constructed from plastic material 36, such as PVC film or other polyester material, but may alternatively be constructed of nylon, polyurethane, or other materials impermeable to air and moisture. The plastic material is preferably heat sealed together around their edges to form the envelope 34. Alternatively, the envelope 34 can be constructed of a plastic material 36 that has been folded on itself and sealed at its edges.

The inflation system 10 includes a primary cylinder or container 42 that is pressurized with a primary fluid for inflating the life raft 32, an inflatable actuator bag 44 for actuating the main cylinder 42., and a secondary cylinder or container 46 that is pressurized with a secondary fluid for inflating the actuator bag 44.

Figure 4:
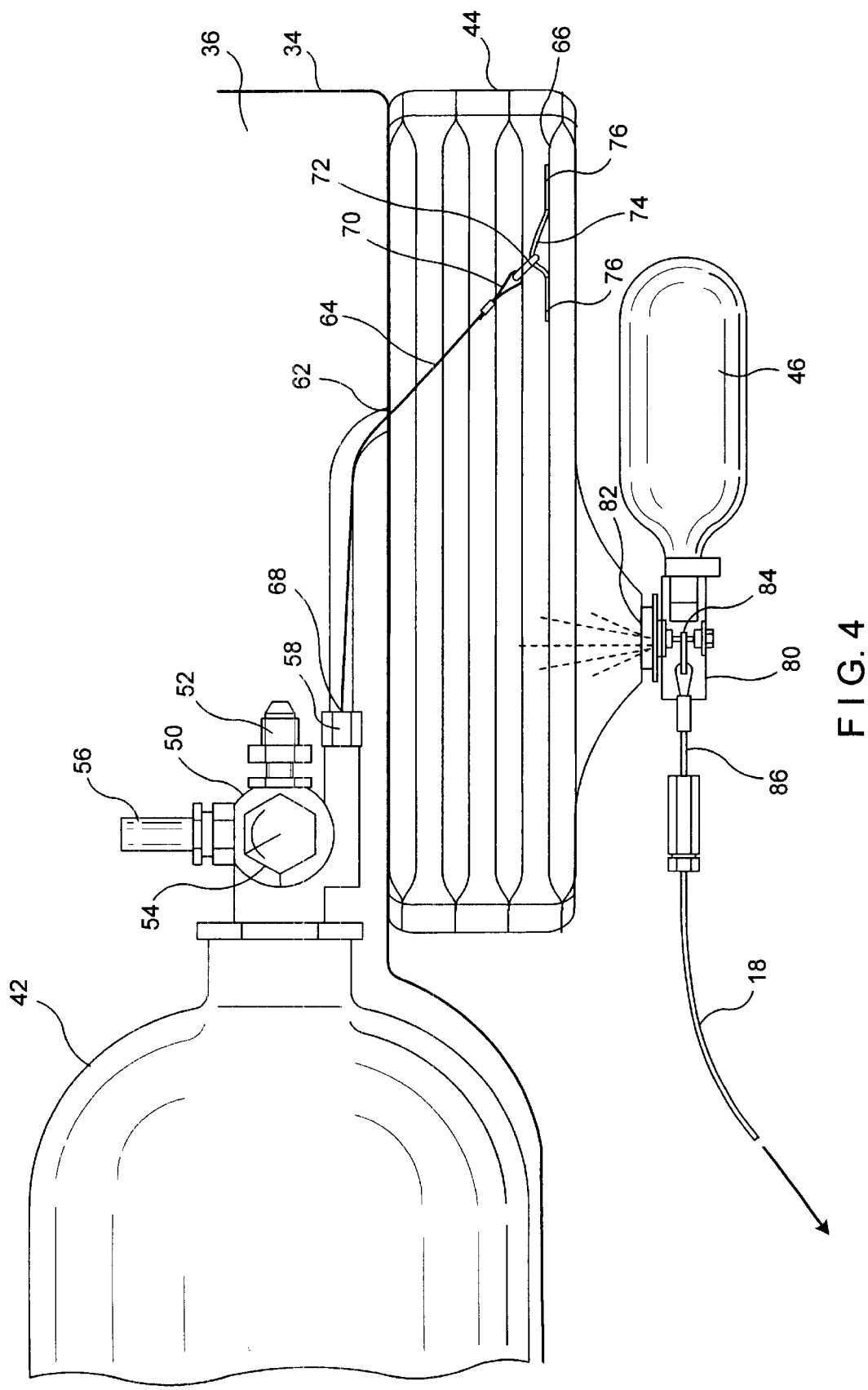
FIG. 4 is a top plan view similar to FIG. 3 of the inflation system in a partially inflated condition.
Figure 5:
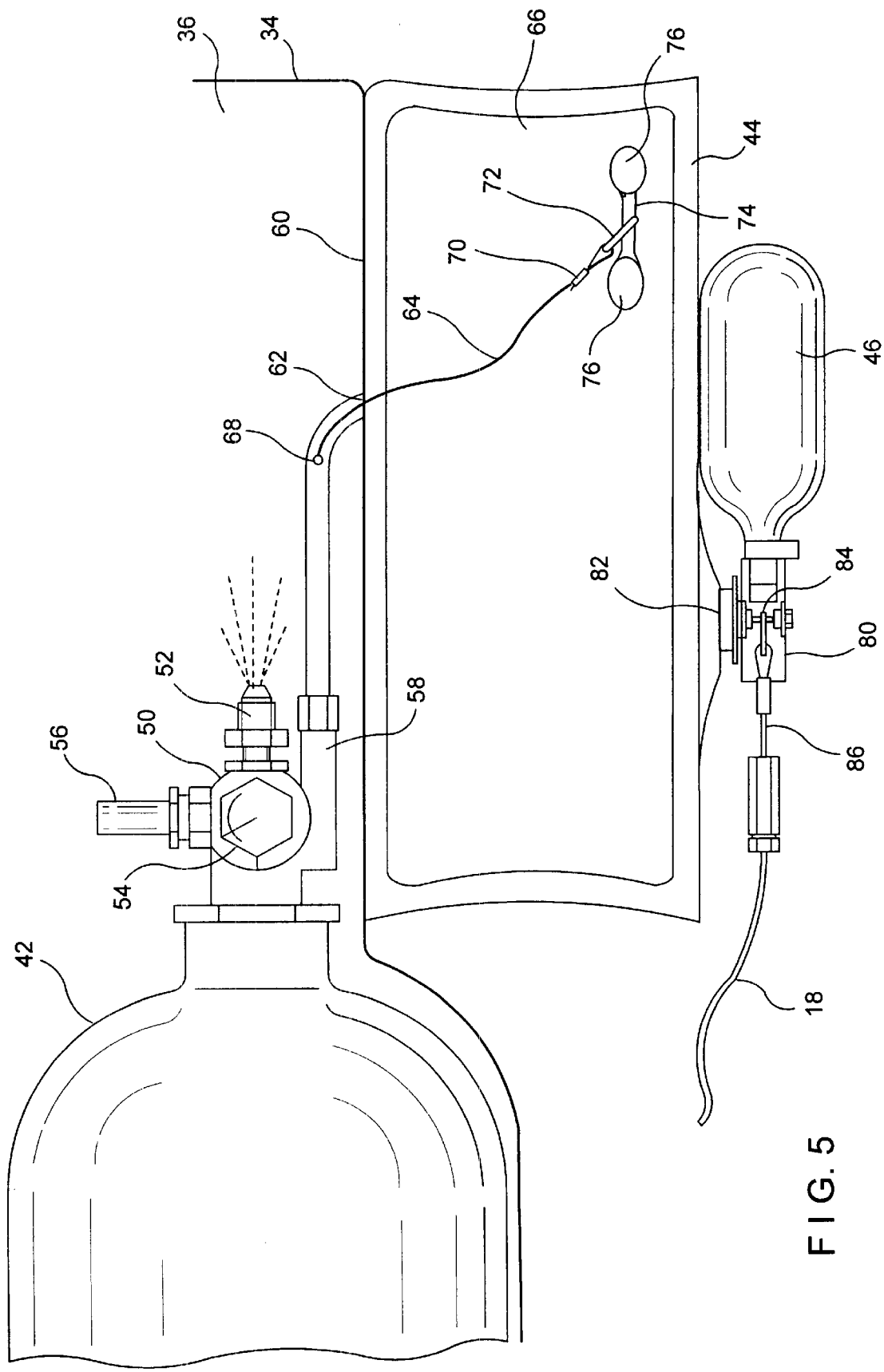
FIG. 5 is a top plan view of the inflation system in a fully inflated condition.

The primary cylinder 42 has a primary valve 50 of conventional construction that is preferably located in the vicinity of the envelope 34 and can be subject to vacuum force within the envelope. As best illustrated in FIGS. 3–5, the primary valve 50 preferably include a primary nozzle 52 for discharging fluid under pressure from the primary cylinder 42, a pressure gauge 54 for displaying the fluid pressure inside the primary cylinder, a fill port 56 for charging the primary cylinder with fluid. A primary valve actuator 58 is provided that can be manipulated for manually opening the primary valve 50 and discharging the pressurized fluid from the primary cylinder into the life raft 32.

The inflatable actuator bag 44 is preferably constructed as an appendage of the envelope 34 and is separated from the envelope 34 by a sealing joint 60 that is preferably formed by heat sealing. It should be noted however that other sealing means can be utilized in the invention, such as ultrasonic: welding, adhesives, or the like. A small gap 62 is formed in the sealing joint 60 by leaving a portion of the overlapping plastic material 36 unsealed in the joint 60. With this arrangement, the inflatable actuator bag 44 is also subject to the vacuum force that is present in the envelope 34 when the life raft 32 is vacuum packed.

A first connecting arrangement, cord or lanyard 64, extends into the inflatable actuator bag 44 from the primary valve actuator 58 through the small gap 62. Preferably, a remote end 68 of the first connecting arrangement 64 is connected to the primary valve actuator 58 in a well-known manner. Therefore, when the first connecting arrangement 64 is pulled, the primary valve is actuated to discharge fluid under pressure from the primary cylinder 42 and into the life raft 32. As best shown in FIGS. 4 and 5, the lanyard 64 has a proximal end 70 that is connected to a wall 66 of the inflatable actuator bag 44. A strap 74 has ends 76 that are attached to the wall 66 inside the inflatable actuator bag 44, preferably through heat sealing, although bonding or other fastening arrangements can be used. A ring 72 is secured to the proximal end 70 of the lanyard 64. The ring 72 surrounds the strap 74 between the ends 76 to thereby securely attach the proximal end 70 of the first connecting arrangement 64 to the wall 66 of the inflatable actuator bag 44.

With reference again to FIG. 3, the secondary cylinder 46 has a secondary valve 80 with a secondary nozzle 82 that is sealingly connected to the inflatable actuator bag 44 for discharging fluid under pressure from the secondary cylinder 46 and into the inflatable actuator bag. A secondary valve actuator 84 is provided that can be manipulated for manually opening the secondary valve 80. The secondary valve actuator 84 is in turn connected either directly or indirectly to a proximal end 86 of the second connecting arrangement or the cable 18.

The secondary cylinder 46, including the secondary valve. 80, is preferably of conventional construction, and may be embodied as an inflator currently in use on commercial life vests. As such, the secondary valve actuator 84 may comprise a pin (not shown) that moves in response to tension on the second connecting arrangement or cable 18 to pierce a seal of the secondary cylinder 46, so as to allow pressurized gas to escape through the secondary valve 80 and the secondary nozzle 82 for charging the inflatable actuator bag 44. The pull force for actuating the, secondary valve actuator is preferably in the range of approximately ten to twenty pounds. Preferably, the secondary cylinder is charged with compressed air to approximately 3,000 PSI. This is especially advantageous where the inflation system 10 is installed in one or more wings of the aircraft, and thus can be subjected to outside temperatures of minus 65° F. or less. The compressed air is not affected by the cold, whereas a mixture of Nitrogen and $CO_2$ or other mixtures with $CO_2$ can be. It will be understood that other fluids and mixtures of fluids can be used, including $CO_2$, in environments where the secondary cylinder will not be exposed to extremely cold temperatures.

Referring again to FIG. 2, a second compartment 90 is formed in the compartment 30 and is adapted to accommodate a block 92 of material that extends through the length of the compartment. The block 92 is held taut in the compartment by straps 94 and an associated adjustable buckle assembly 96 in a well known manner. A channel or bore 98 is formed in the block 92 and the cable 18 is positioned within the channel 98. When the cable 18 is pulled, the channel guides the cable movement to provide a suitable pull direction on the secondary valve actuator 84. When the block 92 is constructed with a corrosion resistant cable guide material having a relatively low coefficient of friction, there is less chance that the cable 18 will become stuck or bound as in the prior art cable guide systems that include pulleys or the like.

Figure 6:
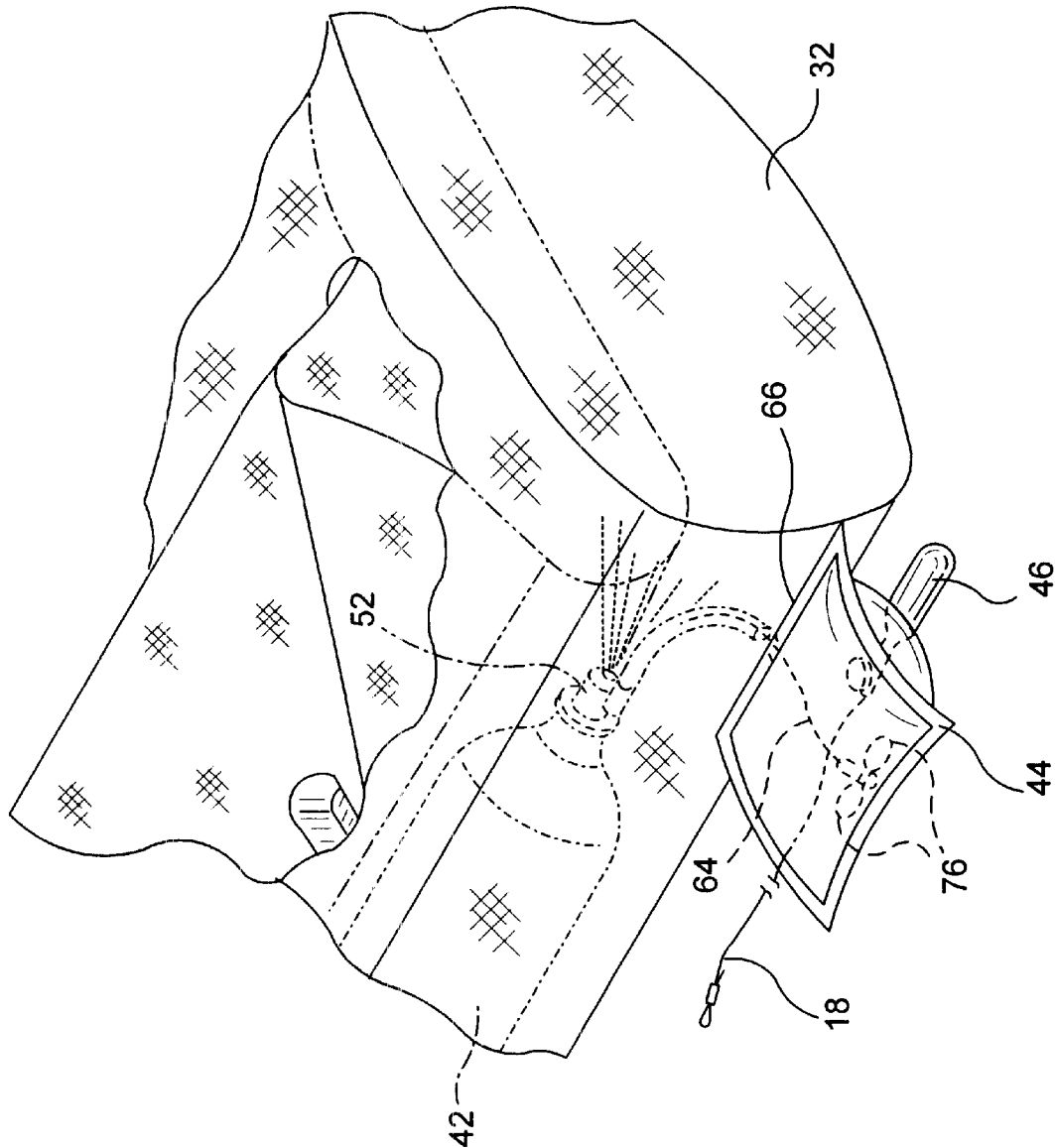
FIG. 6 is a perspective view of a portion of the inflation system and a portion of the life raft in an inflated condition.

In use, and with reference now to FIGS. 3–6, the inflatable actuator bag 44 is initially stored in a compressed, folded condition and under vacuum together with the envelope 34, as shown in FIG. 3. In this position, the first connecting arrangement or lanyard 64 is held in a relaxed position under vacuum pressure that exists in the envelope 34 and the inflatable actuator bag 44. Thus, there is no pulling force exerted on the primary valve actuator 58. When the second connecting arrangement or cable 18 is pulled, either manually by a pilot or other person or automatically through well-known mechanisms, the secondary valve opens, as previously described. Therefore, gas under pressure is discharged into the inflatable actuator bag 44 from the secondary cylinder 46 to thereby charge the inflatable actuator bag, as shown in FIG. 4. Inflation of the inflatable actuator bag 44 releases the vacuum holding of the first connecting arrangement or lanyard 64 and also causes the lanyard 64 to become taut. In this manner, only approximately 10 to 20 pounds pull secondary force need be exerted by the lanyard 18 to open or actuate the secondary valve 80 instead of the approximately 100 to 150 pounds pull force required by the prior art to both break the vacuum and open the valve. As the actuator bag fills with fluid, as shown in FIGS. 5 and 6, the lanyard 64 is pulled to activate the primary valve actuator 58. Eventually the distal end 68 of the lanyard breaks free of the primary valve actuator 58 and the pressurized fluid from the primary cylinder 42 is discharged into the life raft 32 through the primary valve 52 to thereby inflate the life raft. The length of the lanyard 64 can vary depending on the particular size of the actuator bag 44 and the length of the stroke required to trigger the primary valve actuator 58, and can range anywhere from approximately one inch to approximately ten inches or more.

With the above-described arrangement, only a manual or automatic secondary pull force of approximately 10 to 20 pounds needs be exerted on the cable 18 to generate the compounded force of approximately 5 to 10 pounds of primary pull force needed on the lanyard 64 to actuate the primary valve 52 and inflate the life raft 32. In this manner, pilots, other personnel and/or automatic triggering means can activate the inflation system 10 with minimal effort, resulting in an inflation system that is easier to use, is more reliable in operation. This arrangement substantially reduces or eliminates damage to adjacent components over prior art solutions. It will be understood that the ranges of pull forces for opening the valves of the primary and secondary cylinders are given by way of example only, and may vary greatly depending on the size of the cylinders, the type of valves used, the size of the structure(s) to be inflated, the presence or absence of a vacuum force, as well as other factors. In addition, it is contemplated that a single inflatable actuator bag may be used to deploy more than one life raft or other inflatable structure. Thus, the pull force required to open two or more primary valves may be greater that the pull force required to open a single primary valve, while the pull force on the lanyard required to open the secondary valve remains the same.

While the invention has been taught with specific reference to the aboved-description embodiments, those skilled in the art will recognize that changes can be made in form and detail without departing from the spirit and the scope of the invention. For example, although the inflation system has been described for use with life rafts associated with aircraft, it will be understood that the inflation system can be used in other environments and/or to inflate other inflatable structures. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for deployment of an inflatable structure, the system comprising:
   a primary container fluidly connectable to the inflatable structure, the primary container having a primary pressurized fluid situated therein and a primary valve movable under a primary force from a closed position while maintaining the primary pressurized fluid in the primary container to an open position in which the primary pressurized fluid is expelled from the primary container into the inflatable structure for its inflation;
   an inflatable actuator bag; and
   a secondary container fluidly connectable to the inflatable actuator bag, the secondary container having a secondary pressurized fluid situated therein and a secondary valve movable under a secondary force from a closed position while maintaining the secondary pressurized fluid in the secondary container to an open position in which the secondary pressurized fluid is expelled from the secondary container into the inflatable actuator bag;
   wherein application of the secondary force to the secondary valve is resulted in inflation of the inflatable actuator bag by the secondary pressurized fluid, so as to generate the primary force causing opening of the primary valve and inflation of the inflatable structure by the primary pressurized fluid.

2. A system according to claim 1, wherein the secondary force is greater than the primary force.

3. A system according to claim 2, further comprising a first connecting arrangement extending between the primary valve and the inflatable actuator bag, wherein inflation of the actuator bag results in pulling of the first connecting arrangement causing application of die primary force and opening of the primary valve.

4. A system according to claim 3, further comprising an envelope for receiving the inflatable structure.

5. A system according to claim 4, wherein the envelope is vacuum sealed when the inflatable structure is located in die envelope.

6. A system according to claim 5, wherein the inflatable actuator bag is integrally formed with the envelope.

7. A system according to claim 6, wherein the first connecting arrangement is a lanyard which extends from a wall of the inflatable actuator bag and through a seal formed between the envelope and the inflatable actuator bag.

8. A system according to claim 1, and further comprising a second connecting arrangement associated with at least the secondary valve, so that pulling of the secondary connecting arrangement generates the secondary force which causes opening of the secondary valve and inflation of the actuator bag.

9. A system according to claim 8, wherein the second connecting arrangement is a cable having one end thereof associated with the secondary valve, so that the secondary force is generated when the cable is pulled from a remote location.

10. A system according to claim 9, wherein the inflatable actuator bag is integrally formed with the envelope.

11. A system for deployment of an inflatable structure, the system comprising:

a primary container fluidly connectable to the inflatable structure, the primary container having a primary pressurized fluid situated therein, so that upon application of a primary force the primary pressurized fluid is expelled from the primary container into the inflatable structure for its inflation;

an inflatable actuator bag; and a secondary container fluidly connectable to the inflatable actuator bag, the secondary container having a secondary pressurized fluid situated therein, so that upon application of a secondary force the secondary pressurized fluid is expelled from the secondary container into the inflatable actuator bag for its inflation;

wherein application of the secondary force causes inflation of the inflatable actuator bag by the secondary pressurized fluid, so as to generate the primary force to thereby inflate the inflatable structure.

12. In combination, an inflatable structure and a system for deployment of the inflatable structure, comprising:

an envelope containing the inflatable structure, the envelope being subject to vacuum pressure therein;

a primary container fluidly connectable to the inflatable structure, the primary container having a primary pressurized fluid situated therein and a primary valve, the primary valve is movable under a primary force from a closed position while maintaining the primary pressurized fluid in the primary container to an open position in which the primary pressurized fluid is discharged from the primary container into the inflatable structure causing its inflation, the primary valve being subject to the vacuum pressure in the envelope;

an inflatable actuator bag associated with the envelope and being subject to the vacuum pressure;

a first connecting arrangement between the envelope and the inflatable actuator bag, a distal end of the first connecting arrangement being connected to the primary valve, and a proximal end of the first connecting arrangement being connected to the inflatable actuator bag; and a secondary container fluidly connectable to the inflatable actuator bag, the secondary container having a secondary pressurized fluid situated therein, a secondary valve movable under a secondary force from a closed position while maintaining the secondary pressurized fluid in the secondary container to an open position in which the secondary pressurized fluid is discharged into the inflatable actuator bag;

wherein application of the secondary force to the secondary valve causes the secondary pressurized fluid to inflate the inflatable actuator bag thereby overcoming the vacuum force and causing the first connecting arrangement to open the primary valve with the primary force, so as to inflate the inflatable structure.

13. A combination according to claim 12, wherein the secondary force is greater than the primary force.

14. A combination according to claim 12, wherein the inflatable actuator bag is integrally formed with the envelope.

15. A combination according to claim 12, wherein the inflatable structure comprises a life raft.

16. A combination according to claim 12, wherein the first connecting arrangement is a cable.

17. A combination according to claim 12, further comprising a second connecting arrangement associated with at least the secondary valve, so that pulling of the second connecting arrangement generates the secondary force which causes opening of the secondary valve and inflation of the actuator bag.

18. A combination according to claim 17, wherein the second connecting arrangement is a lanyard having one end thereof associated with the secondary valve, the secondary force is generated when the lanyard is pulled from a remote location.

19. A combination according to claim 18, and further comprising a block with a channel for receiving the lanyard, the channel being shaped to guide the lanyard movement to thereby facilitate opening of the secondary valve by applying the secondary force.

* * * * *

UNITED STATES PATENT AND TRADEMARK OFFICE
CERTIFICATE OF CORRECTION

PATENT NO. : 6,644,596 B1
DATED : November 11, 2003
INVENTOR(S) : Jurlina et al.

It is certified that error appears in the above-identified patent and that said Letters Patent is hereby corrected as shown below:

<u>Column 6,</u>
Line 53, should read -- arrangement causing application of the primary force and --.
Line 58, should read -- vacuum sealed when the inflatable structure is located in the --.

Signed and Sealed this

Twenty-eighth Day of March, 2006

JON W. DUDAS
*Director of the United States Patent and Trademark Office*